United States Patent
Wang

(10) Patent No.: US 7,282,166 B2
(45) Date of Patent: Oct. 16, 2007

(54) CONSTANT VELOCITY JOINT PLUNGE BOOT

(75) Inventor: Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 258 days.

(21) Appl. No.: 11/021,873

(22) Filed: Dec. 22, 2004

(65) Prior Publication Data

US 2006/0135270 A1    Jun. 22, 2006

(51) Int. Cl.
B29C 45/76    (2006.01)
(52) U.S. Cl. .................. 264/40.1; 29/DIG. 29
(58) Field of Classification Search .......... 264/40.1, 264/219, 331.13; 29/407.1, DIG. 29; 464/173, 464/903; 277/635, 924; 74/18–18.2
See application file for complete search history.

(56) References Cited

U.S. PATENT DOCUMENTS

| | | | | |
|---|---|---|---|---|
| 2,065,834 A | * | 12/1936 | Swennes | .................. 74/18.1 X |
| 3,550,991 A | * | 12/1970 | Wesoloski | .................. 277/636 |
| 4,756,640 A | * | 7/1988 | Gehrke | .................... 74/18.1 X |
| 5,236,204 A | * | 8/1993 | Hempel | ..................... 277/636 |
| 5,899,814 A | | 5/1999 | Murillo | |
| 6,368,224 B1 | | 4/2002 | Knodle et al. | |
| 6,533,669 B2 | | 3/2003 | Knodle et al. | |
| 6,776,720 B2 | | 8/2004 | Bartlett | |
| 6,817,950 B2 | | 11/2004 | Dine | |

* cited by examiner

*Primary Examiner*—Greg Binda
(74) *Attorney, Agent, or Firm*—Jennifer M. Brumbaugh; Mick A. Nylander

(57) ABSTRACT

A method of forming a flexible component includes performing a stress analysis on potential configurations of the component. A desired as-molded shape can be selected from the configurations that were analyzed based upon the stresses resulting from manipulation.

20 Claims, 3 Drawing Sheets

CONSTANT VELOCITY JOINT PLUNGE BOOT

TECHNICAL FIELD

The present invention relates to the manufacture of flexible boots and in particular to a method of manufacturing a constant velocity joint (CVJ) boot constructed of selectively deformable material that has reduced stress areas during operation.

BACKGROUND

Universal joints, and especially constant velocity joints, operate to transmit torque between two rotational members. A cage, or yoke, that allows the rotational members to operate with their respective axes at a relative angle, typically interconnects the rotational members. Constant velocity joints and similar rotating couplings typically include a flexible boot to enclose and protect the coupling during operation. The boot seals lubricant within the joint so as to reduce friction and extend the life of the joint. The boot also seals out dirt, water and other contaminants to protect the functionality of the joint. In addition, because the boot is typically flexible, the boot is able to seal around the joint while permitting articulation and relative angular movement of the rotational members.

Universal joints are commonly classified by their operating characteristics. One important operating characteristic relates to the relative angular velocities of the two connected rotational members or shafts. In a constant velocity type of universal joint, the instantaneous angular velocities of the two shafts are equal, regardless of the relative angular orientation between the two shafts. In a non-constant velocity type of universal joint, the instantaneous angular velocities of the two shafts vary with the angular orientation (although the average angular velocities for a complete rotation are equal). Another important operating characteristic is the ability of the joint to allow relative axial movement between the two shafts. A fixed joint does not allow this relative movement, while a plunge joint does allow this movement.

A typical constant velocity universal joint includes a cylindrical inner race that is connected to one of the rotational members or shafts and a hollow cylindrical outer race that is connected to the other of the rotational members or shafts. In one such example, the outer surface of the inner race and the inner surface of the outer race each have a plurality of grooves formed therein. Each groove formed in the outer surface of the inner race is associated with a corresponding groove formed in the inner surface of the outer race. A ball or torque-transmitting member is disposed in each of the associate pairs of grooves. The balls provide a driving connection between the inner and outer races. An annular cage is typically provided between the inner and outer races for retaining the balls in the grooves. The cage is provided with a plurality of circumferentially spaced openings for this purpose. In a typical plunge joint, the connection between the cylindrical inner race and the rotational member or shaft is a splined connection to permit relative axial translation between the cylindrical inner race and the shaft.

FIG. 1 illustrates a prior art plunge boot 10. Plunge boot 10 has a frusto-conical shaped elongated body to accommodate axial movement with a plunge CVJ. Plunge boot 10 is molded in a frusto-conical shape for ease of manufacture that reduces costs associated with molding.

To install plunge boot 10 on a CVJ, plunge boot 10 must be manipulated into a predetermined installed configuration. In prior art plunge boot designs, plunge boot 10 includes a large end 12 that is inverted over a middle portion 14 when installed and operated. The inversion, or folding, of the prior art plunge boot 10 forms a curve in portion 16 of the boot 10. However, the inversion of the prior art plunge boot 10 induces undesirable stress and strain in the portion 16. During operation, the plunge boot 10 may fail in the portion 16 due to these induced, post manufacture, stresses.

Another disadvantage of the prior art plunge boot 10 is that the inversion may create a wrinkling within the contour of the boot. The wrinkling provides additional stress points for failure to occur. Therefore, a boot is needed that can accommodate axial extension, but minimizes induced stresses when installed on the joint assembly.

SUMMARY OF THE INVENTION

The present invention relates to a method of manufacturing a flexible component. An embodiment of the method includes selecting a desired first component, wherein the selected first component experiences a deformation of shape when manipulated into a second configuration. The method also includes performing an analysis of induced stresses in the first component, wherein the analysis is conducted on the second configuration of the component. The method further includes selecting a desired configuration of the first component, and molding a second component, where the molding includes at least partially curing the second component generally in the desired configuration.

A further embodiment of the present invention provides a boot that includes a curved portion, wherein said curved portion is formed in a desired configuration, and wherein said configuration is determined by analyzing a plurality of potential configurations of a component and selecting the desired configuration that results in a desired amount of stress in a deformed shape of the component.

BRIEF DESCRIPTION OF THE DRAWINGS

The present invention will now be described, by way of example, with reference to the accompanying drawings, in which.

DETAILED DESCRIPTION

Figure 2:
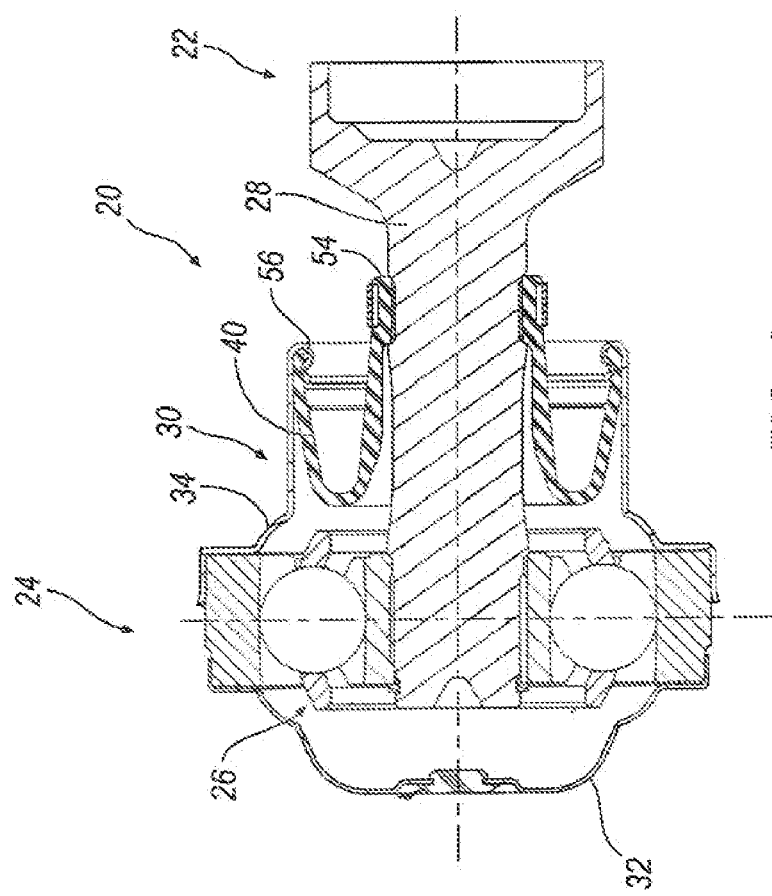
FIG. 2 is a partial sectional view of a constant velocity joint that utilizes a plunge boot in accordance with an embodiment of the present invention.

Now referring to the figures, FIG. 2 illustrates a CVJ 20 incorporating an embodiment of the present invention. CVJ 20 includes driven end 22 and a driving end 24. CVJ 20 further includes a joint assembly 26 coupled to a shaft 28 with a boot assembly 30 connected therebetween. CVJ 20 further includes a grease cover 32 that seals the driving end 24. Boot assembly 30 includes a cover 34 and a boot 40. A portion of cover 34 is crimped onto boot 40 for attachment thereto, although other forms of attachment, such as fasteners or over-molding of boot 40 on cover 34 may also be employed.

Joint assembly 26 can be any type of articulated universal joint, including a plunging tripod, a fixed tripod, a plunging ball joint, and a fixed ball joint. Typical joint assemblies are disclosed in commonly owned U.S. Pat. Nos. 6,817,950, 6,776,720, 6,533,669 and 6,368,224, and U.S. Pat. No. 5,899,814, the disclosures of which are hereby incorporated by reference in their entireties. As will be discussed in greater detail herein, boot 40 is especially adapted for a plunging type of joint assembly 26. During operation of CVJ 20, boot 40 accommodates relative axial displacement of joint assembly 26 and shaft 28 while maintaining a seal therebetween. The axial displacement may be in a range of about 0-15 mm to about 0-19 mm, but can be any suitable range of axial displacement for a CVJ 20.

Figure 4:
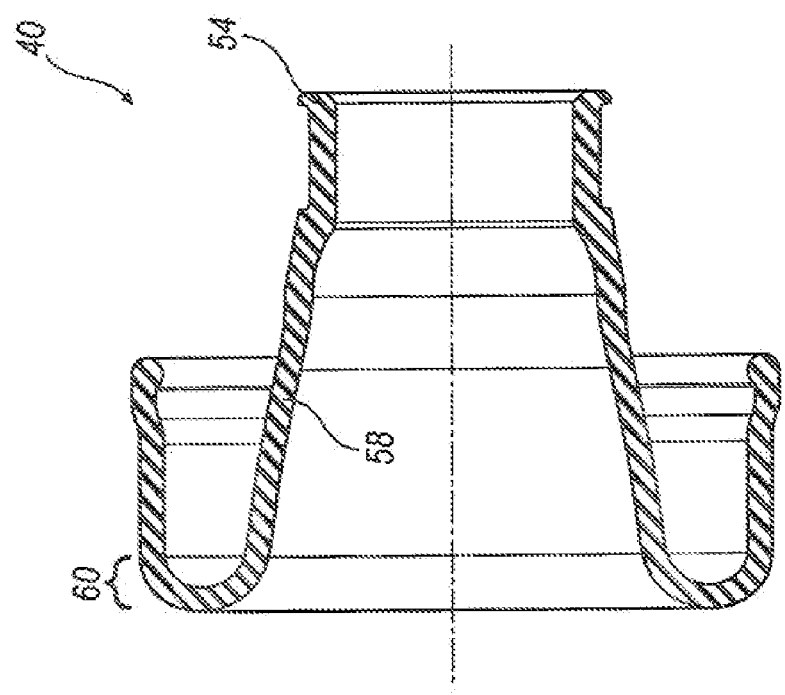
FIG. 4 is a sectional view the boot of FIG. 3.
Figure 3:
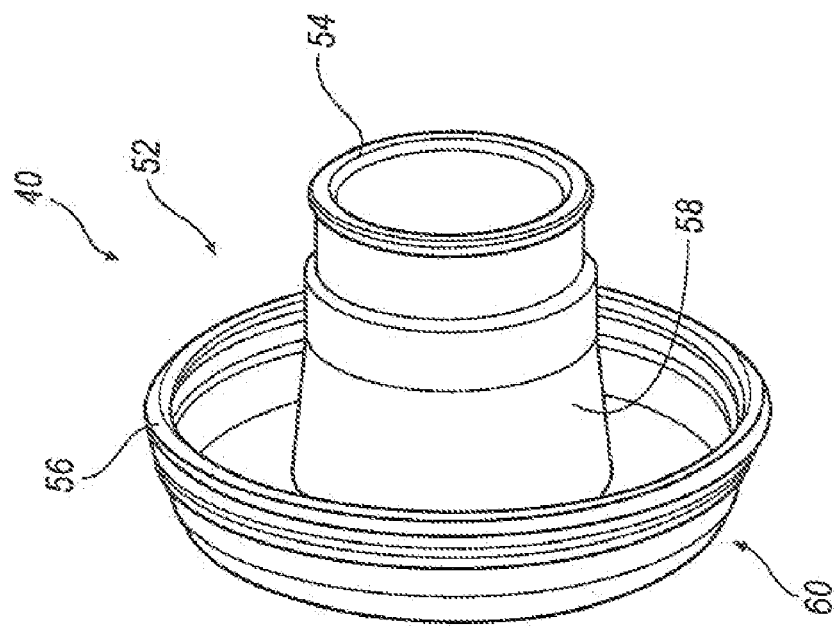
FIG. 3 is a perspective view of a plunge boot in accordance with an embodiment of the present invention illustrated in an as-molded shape.

Referring to FIGS. 3 and 4, boot 40 in accordance with an embodiment of the present invention is illustrated. Boot 40 includes a contoured body of revolution 52 having a small end 54, a large end 56, a middle portion 58, and a curved portion 60. As illustrated in FIG. 2, small end 54 is coupled to shaft 28 and large end 56 is coupled to joint assembly 26. Small end 54 may be coupled to shaft 28 with a conventional type of clamp, connector or any other suitable fastening technique. As illustrated, large end 56 is coupled to cover 34, while cover 34 is coupled by fasteners or the like to joint assembly 26.

Figure 1:
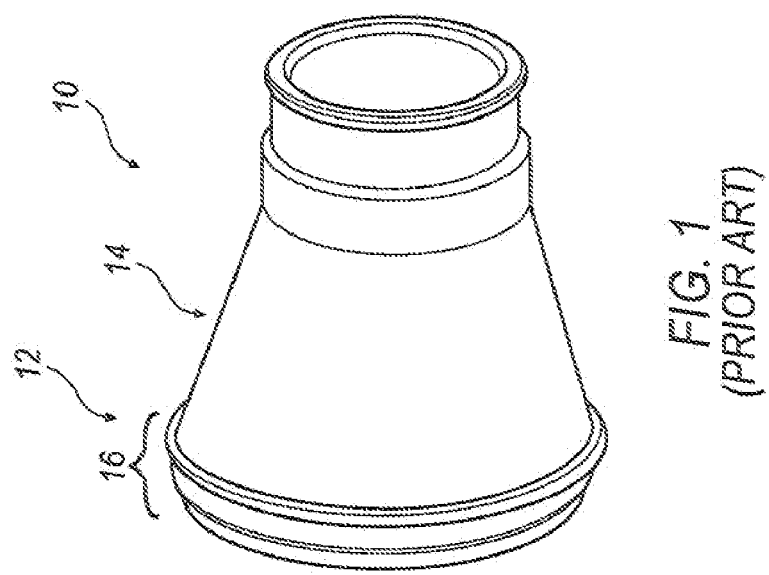
FIG. 1 is a perspective view of a prior art plunge boot illustrated in an as-molded shape before being inverted into an operational shape.
Figure 5:
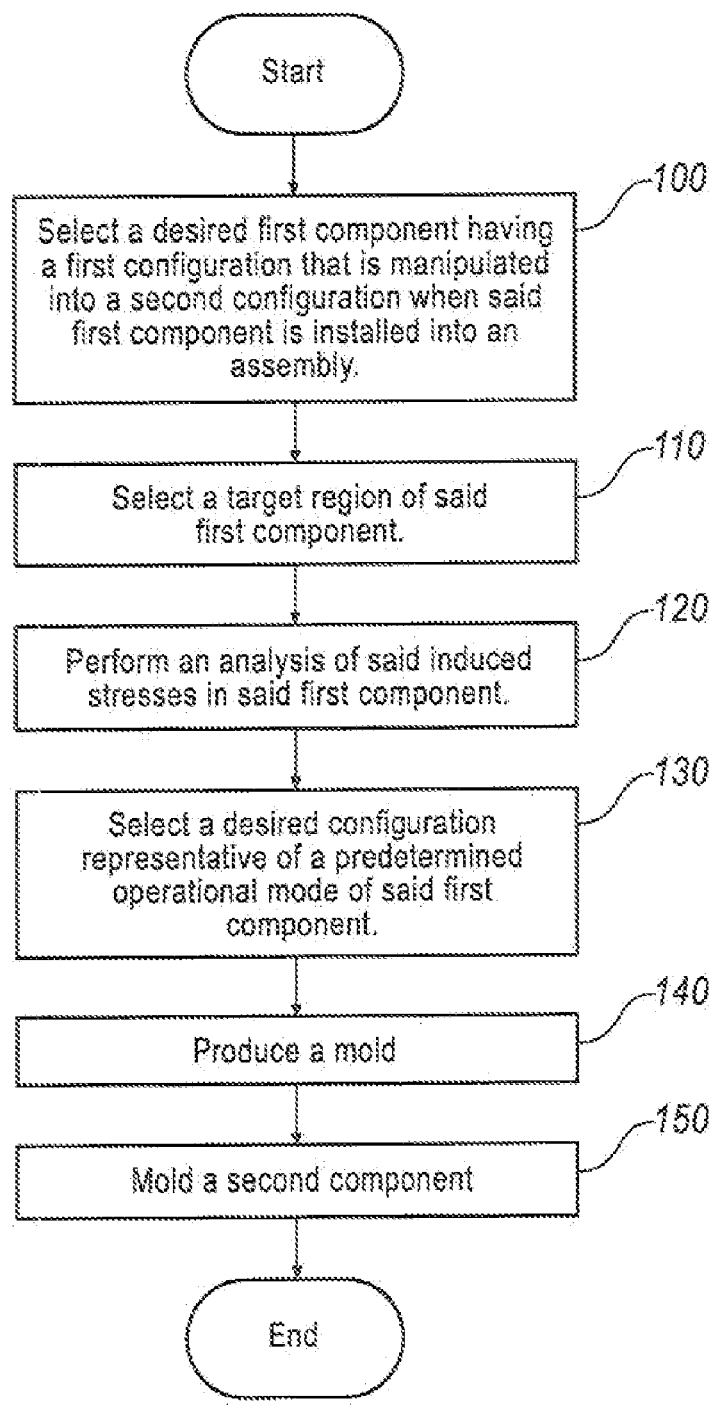
FIG. 5 is a flow chart illustrating an embodiment of a method of manufacturing a flexible component.

Boot 40 is illustrated in both an operational shape and an as-molded shape in FIGS. 2-4. Unlike the prior art plunge boot 10, boot 40 has generally the same shape in the as molded and the operational modes. For example, the prior art plunge boot 10 is molded as illustrated in FIG. 1 and then inverted, or manipulated into an operational shape. By forming or molding boot 40 directly into the operational shape (Step 150 of FIG. 5), the induced stresses in curved portion 60 associated with inverting a conical plunge boot 10 are greatly reduced. This reduction of stresses in curved portion 60 reduces the likelihood of failure during operation within curved portion 60.

A target region for reduction of stresses (Step 110 of FIG. 5) is preferably curved portion 60 in boot 40, but may not be readily discernable from the manipulated shape of a component. The target region may be selected prior to analysis (Step 120 of FIG. 5), based upon a known failure area, or may be identified by an analysis, as discussed in greater detail herein.

In accordance with an embodiment of a preferred method of the present invention, a component, such as a plunge boot 10 (Step 100 of FIG. 5) is analyzed in a first configuration (Step 120 of FIG. 5) to determine the operational shape, or desired configuration, that results in a higher amount of stresses that are desirably reduced. The analysis is preferably a finite element analysis (FEA), but may be any suitable analysis that can indicate a region of greater stress, deflection, wrinkling, or distortion for a potential operational shape or desired configuration. A specific configuration may be analyzed, or a plurality of configurations that represent a range of potential configurations during operation may be analyzed. When analyzing a range of configurations, a desired configuration, or deformed shape, to be molded is selected (Step 100 of FIG. 5). This desired configuration is selected over the other configurations analyzed based upon the results of the analysis. An example of a factor that may guide the decision to select a particular configuration is the maximum analyzed stress experienced in a target region during manipulation of the component in an operational range of configurations. Another example of a factor that may guide the decision to select a particular configuration is excessive or maximum wrinkling in a target region.

When a shape to be molded is selected (Step 130 of FIG. 5), a mold that will produce a second configuration, as illustrated in FIGS. 2-4 is constructed (Step 140 of FIG. 5), or other suitable molding process is selected that will result in a component being at least partially cured in the desired as-molded shape. The resulting second component, when formed (Step 150 of FIG. 5), has reduced stresses in the target region when in the operational shape, or desired configuration, when compared to other components that must be manipulated into the operational shape after forming. A curing process need not entirely cure the boot 40 within a mold, but may allow boot 40 to cure or solidify outside a mold (Step 150 of FIG. 5).

The first component need not have a defined shape as-molded, but may be a proposed shape as-molded with a known range of operational shapes that can be analyzed for stresses in the range of known operational shapes. In this manner, the method of the present invention may be performed prior to manufacturing any component. Additionally, an elastomeric component with a larger range of motion may be modeled as being formed in any number of potential operational shapes and then each potential operational shape may be analyzed in a range of deformed shapes as described herein. The potential operational shape resulting in the deformed shapes that have the lowest stresses, or the lowest maximum stresses for any deformed shape, may be selected as the desired as-molded shape. Thus provided, a boot 40 can be manufactured with an optimized as-molded shape that results in lower maximum stresses during operation when compared to other as-molded shapes.

Boot 40 is preferably a flexible material, and may be plastic or any elastomer, such as rubber, silicone, or thermoplastic elastomer (TPE). Desirable materials that are specifically compatible within a CVJ 20 environment are hydrogenated nitrile butadiene rubber (HNBR), silicone rubber (Q, MQ, VMQ) and chloroprene rubber (CR). Boot 40 may be provided for an articulating joint, or a may be used as a seal or a diaphragm that accommodates axial displacement. Additionally, boot 40 may be molded onto any portion of a compatible element, such as cover 34.

While the invention has been described with respect to specific examples including various modes of carrying out the invention, those skilled in the art will appreciate that there are numerous variations and permutations of the above described systems and techniques that fall within the spirit and scope of the invention as set forth in the appended claims.

What is claimed is:

1. A method of manufacturing a flexible component for a joint assembly, comprising the steps of:
    selecting a desired first component having a first configuration that is manipulated into a second configuration when said first component is installed into the joint assembly, wherein the selected first component experiences a deformation of shape when manipulated into said second configuration resulting in induced stresses in selected portions of said first component;
    performing an analysis of said induced stresses in said first component, wherein said analysis is performed on said second configuration of said first component;
    selecting a desired configuration representative of a predetermined operational mode of said first component; and molding a second component, wherein said molding includes at least partially curing said second component generally in said desired configuration and said second component requires less manipulation from an as-molded shape than said first component for a similar operating mode.

2. The method of claim 1, wherein the step of performing said analysis is conducted for each of a plurality of configurations of the first component.

3. The method of claim 2, wherein said step of selecting said desired configuration includes determining which of said plurality of configurations produces the greatest stresses in a target region.

4. The method of claim 3, wherein said target region is an area of known failure.

5. The method of claim 3, wherein said target region is an area of high distortion.

6. The method of claim 1, wherein said second configuration represents an operational shape of said first component.

7. The method of claim 1, further comprising the step of selecting a target region of said first component.

8. The method of claim 7, wherein said target region is within an area of known failure.

9. The method of claim 7, wherein said target region is an area of high distortion.

10. The method of claim 1, further comprising the step of producing a mold, wherein said mold selectively retains said second component generally in said desired configuration.

11. The method of claim 1, wherein said second component is made of a material selected from the group consisting of hydrogenated nitrile butadiene rubber, silicone rubber, chloroprene rubber and thermoplastic elastomers.

12. The method of claim 1, wherein said second component is a dust boot.

13. The method of claim 1, wherein performing an analysis of said induced stresses in said first component includes performing a finite element analysis.

14. The method of claim 1, wherein selecting a desired first component includes selecting a flexible boot for the joint assembly, wherein the flexible boot generally seals a lubricant within the joint assembly.

15. A method of manufacturing a flexible component for a joint assembly, comprising the steps of:
    selecting a desired first component having a first configuration that is manipulated into a second configuration when said first component is installed into the joint assembly, wherein the selected first component experiences a deformation of shape when manipulated into said second configuration resulting in induced stresses in selected portions of said first component;
    performing a finite element analysis of said induced stresses in said first component, wherein said analysis is performed on said second configuration of said first component;
    selecting a desired configuration representative of a predetermined operational mode of said first component; and
    molding a second component, wherein said molding includes at least partially curing said second component generally in said desired configuration.

16. The method of claim 15, further comprising the step of producing a mold, wherein said mold selectively retains said second component generally in said desired configuration.

17. The method of claim 15, further comprising the step of producing a mold, wherein said mold selectively retains said second component generally in said desired configuration.

18. The method of claim 15, wherein the step of performing said analysis is conducted for each of a plurality of configurations of the first component.

19. The method of claim 18, wherein said step of selecting said desired configuration includes determining which of said plurality of configurations produces the greatest stresses in a target region.

20. The method of claim 19, wherein said target region is an area of known failure.

* * * * *